United States Patent [19]

Kogiso et al.

[11] E Re. 31,177

[45] Reissued Mar. 15, 1983

[54] APPARATUS FOR MAKING PLATES FOR PRINTING

[76] Inventors: Masahiro Kogiso, 1-31-16, Fujimoto, Kokubunji-shi, Tokyo; Minehiro Sakata, 546 Yokokawa-cho, Hachioji-shi, Tokyo; Hatsuo Oda; Tamio Iwamoto, both of 3-20-10, Tamadaira, Hino-shi, Tokyo, all of Japan

[21] Appl. No.: 967,775

[22] Filed: Dec. 8, 1978

Related U.S. Patent Documents

Reissue of:

[64] Patent No.: 4,114,999
Issued: Sep. 19, 1978
Appl. No.: 740,086
Filed: Nov. 9, 1976

[30] Foreign Application Priority Data

Nov. 14, 1975 [JP] Japan ..... 50-137457
Mar. 26, 1976 [JP] Japan ..... 51-37098[U]
Mar. 26, 1976 [JP] Japan ..... 51-37099[U]

[51] Int. Cl.[3] ..... G03G 15/00

[52] U.S. Cl. ..... 355/3 R; 355/11; 355/13; 355/16; 355/10

[58] Field of Search ..... 355/10, 3 R, 11, 16, 355/13, 65, 75, 76

[56] References Cited

U.S. PATENT DOCUMENTS

| | | | |
|---|---|---|---|
| 2,758,503 | 8/1956 | Luffman et al. | 355/75 |
| 2,940,358 | 6/1960 | Rosenthal | 355/11 X |
| 3,088,386 | 5/1963 | Sugarman | 355/11 |
| 3,698,804 | 10/1972 | Cranskens | 355/11 X |
| 3,850,520 | 11/1974 | Washio et al. | 355/13 |
| 3,976,373 | 8/1976 | Kawakubo et al. | 355/3 R |

FOREIGN PATENT DOCUMENTS

| | | | |
|---|---|---|---|
| 1077133 | 7/1967 | United Kingdom | 355/3 R |

*Primary Examiner*—Richard L. Moses
*Attorney, Agent, or Firm*—Paul & Paul

[57] ABSTRACT

An electro-fax type of apparatus for making a plate for offset printing, wherein a system for processing a master paper to be made into the plate is disposed on a horizontal plane so that the master paper is forwarded in the horizontal direction and an optical system is disposed on a plane traversing the forwarding direction of the master paper. The apparatus can be disassembled into several sections which are transportable as individual units, and also can be easily reassembled without deterioration of the accurately adjusted functions of the apparatus.

17 Claims, 13 Drawing Figures

107
111
112
111a
X1
112a
A
108
110
107
109a
109b
109
A
113
108
53a
53

110
X1

109b
109
109a 112
111a
111
112a

APPARATUS FOR MAKING PLATES FOR PRINTING

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an apparatus for making a plate for offset printing, and particularly, to an electro-fax type of plate-making apparatus.

The offset printing generally needs an original plate, i.e., master paper, which has a size relatively larger than that of a normal document. Specifically, with the electro-fax type of plate-making appartaus, it is required to process the master paper and the manuscript which have the considerably larger sizes than those to be processed in a case of general copying. Therefore, the plate-making apparatus must be provided with an electro-fax processing system and an optical system, which are suitable in size for use with the master paper. Therefore, in order to avoid the necessity of enlarging the size of the apparatus, some known electro-fax types of plate-making apparatus have been designed as described below.

2. Description of the Prior Art

One known apparatus is provided at the top portion of the body thereof with a manuscript table made of a transparent plate glass, and is constructed so that a picture of the manuscript is reflected by a reflex mirror inclined to the manuscript table and is, in turn, projected by a projection lens onto a vertically disposed exposure table. However, this arrangement contains the following problems:

(a) When being set on the manuscript table, the manuscript must be placed face down on the table. This often causes much inconvenience to the operator and further causes much time to be expended for the setting of the manuscript;

(b) The processing system for the master paper cannot be arranged in a straight line. This frequently causes the master paper to become jammed in the processing mechanism, and;

(c) The reduction in size of the entire apparatus is naturally limited since the width of the processing system is determined according to the size of the master paper to be processed;

accordingly, the expected reduction cannot be realized.

In order to solve these problems on the setting of the manuscript, another known apparatus is provided with an exposure window in its body opposite to the projection lens and with a getting-up and lying-down type of manuscript table which can cover said exposure window. However, this construction contains the following problems:

(d) The operating of this apparatus is very complicated since the manuscript table is located at a distance from the operating panel, and;

(e) The handling of this apparatus is also very complicated since the outlet for the master paper is located at a distance from the operating panel.

Further, the aforementioned problems (b) and (c) cannot be solved.

The processing system of the electro-fax type of plate-making apparatus generally comprises a wet developing device for developing the electrostatic latent image recorded in the master paper (i.e., photosensitive recording paper). A plurality of developing devices has been proposed, in which the developing liquid flows down onto a surface inclined to the horizontal direction so as to form a thin layer of developing liquid. The recording paper is forwarded on said thin layer of liquid and is thus processed to be developed. The Japanese Patent Publication No. 50(1975)-21857, for example, discloses a device wherein the developing is carried out with the recording paper being held on an electrically conductible base forming a support for the recording paper. However, this device is inferior in views of the handling process and of the operating rate when compared to a device wherein the developing is continuously carried out with the recording paper being forwarded. The Japanese Patent Public Disclosure No. 49(1974)-62148, discloses a device wherein the developing is carried out by injecting the developing liquid onto both surfaces of the recording paper. In this device, however, scratches on the face of the recording paper and unevenness of the developing are caused, since the trailing end of the recording paper is caused to flap by the jet of developing liquid after said trailing end of the paper has passed through the developing-liquid injection device.

The processing mechanism also comprises a device for drying and discharging the developed master paper (recording paper). A convenient drying and discharging device in the prior art is so constructed that the recording paper is forwarded by a pair of rollers along the guide plate, while being dried by hot wind produced by a blower and a heater, and is then discharged by a pair of paper discharging roller and paper suppressing roller. However, this device has a disadvantage in that, during a case wherein the drying of the paper is insufficient, the paper is soiled due to the transcription by the paper suppressing roller. If the paper suppressing roller causing the soiling of the paper is removed, the discharging of the paper becomes unstable since the trailing end of the paper is caused to flutter by the hot wind. Further, there is a suction type of device wherein, instead of said rollers and guide plate, a conveyor belt is used for carrying the paper with the latter being caused to adhere onto said belts by means of suction. However, the suction type of device has disadvantages due to its complicated construction and the high cost thereof.

SUMMARY OF THE INVENTION

It is, therefore, a primary object of the present invention to provide a novel and improved electro-fax type of plate-making apparatus in which the aforementioned problems and disadvantages are eliminated.

Another object of the present invention is to provide a novel and improved wet developing device which can be used in the processing mechanism of the plate-making apparatus and which can serve eliminate the aforementioned disadvantages.

A further object of the present invention is to provide a new and improved drying and discharging device which can be used for the processing system of the plate-making and which can also be used to eliminate the aforementioned disadvantages.

We found, in the analysis, that the aforementioned problems of the plate-making apparatus in the prior art are caused by the fact that the apparatus was designed and manufactured under the fixed conception that both the master paper processing system and the optical system should be arranged in a common plane. Therefore, one aspect of the present invention is directed to provide an apparatus wherein the master paper processing system and the optical system are not arranged in a common plane; that is, the master paper processing system is arranged so that a master paper is forwarded in a horizontal direction, while the optical system is arranged in a vertical plane traversing the forwarding direction of the master paper.

We also learned from our experiences that the enlargement in size of the apparatus is a problem, in view of its transporting and/or carrying into a building, rather than in view of the restriction of an installation space for the apparatus. Therefore, another aspect of the present invention is directed to the provision of an apparatus which, when being transported and/or carried into a building, can be disassembled into several sections which are transportable as individual units, and which also can be easily reassembled without deterioration of the accurately adjusted functions of the apparatus.

The above-mentioned and other objects, features, and advantages of the present invention will be more apparent from the following description of the preferable embodiments of the invention, with reference to the accompanying drawings; in which, FIG. 1 is a perspective view of a plate-making apparatus according to the present invention;

Figure 1:
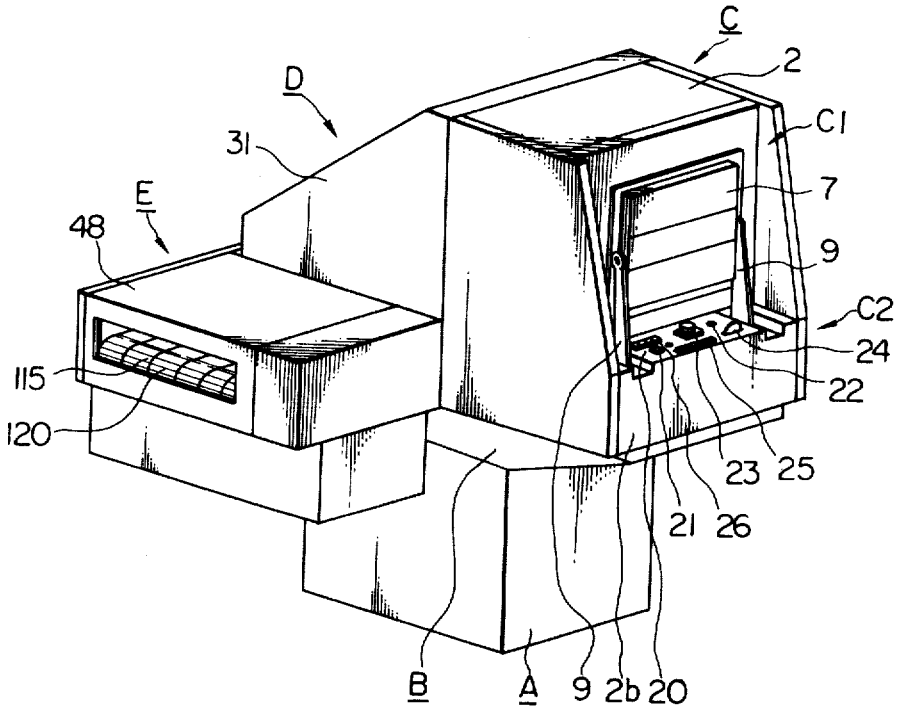
Figure 2:
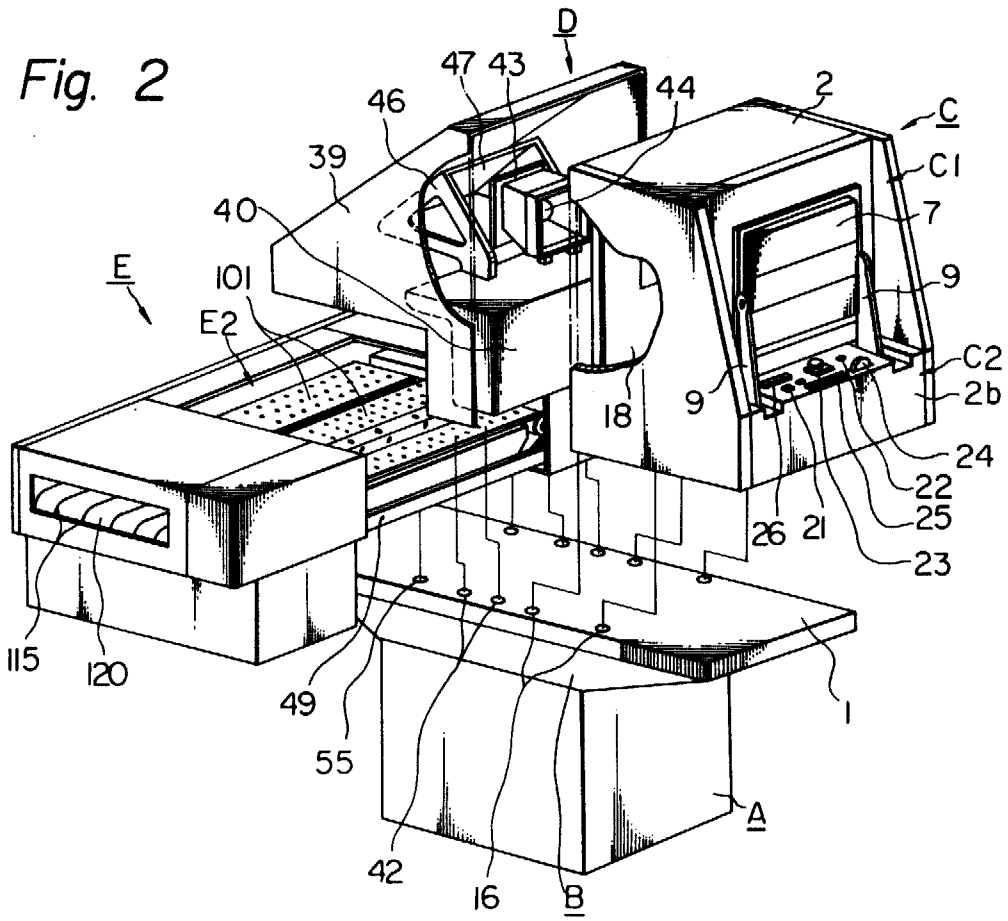
FIG. 2 is a perspective view showing said apparatus in FIG. 1, which has been disassembled into sections and partially cut off.
Figure 3:
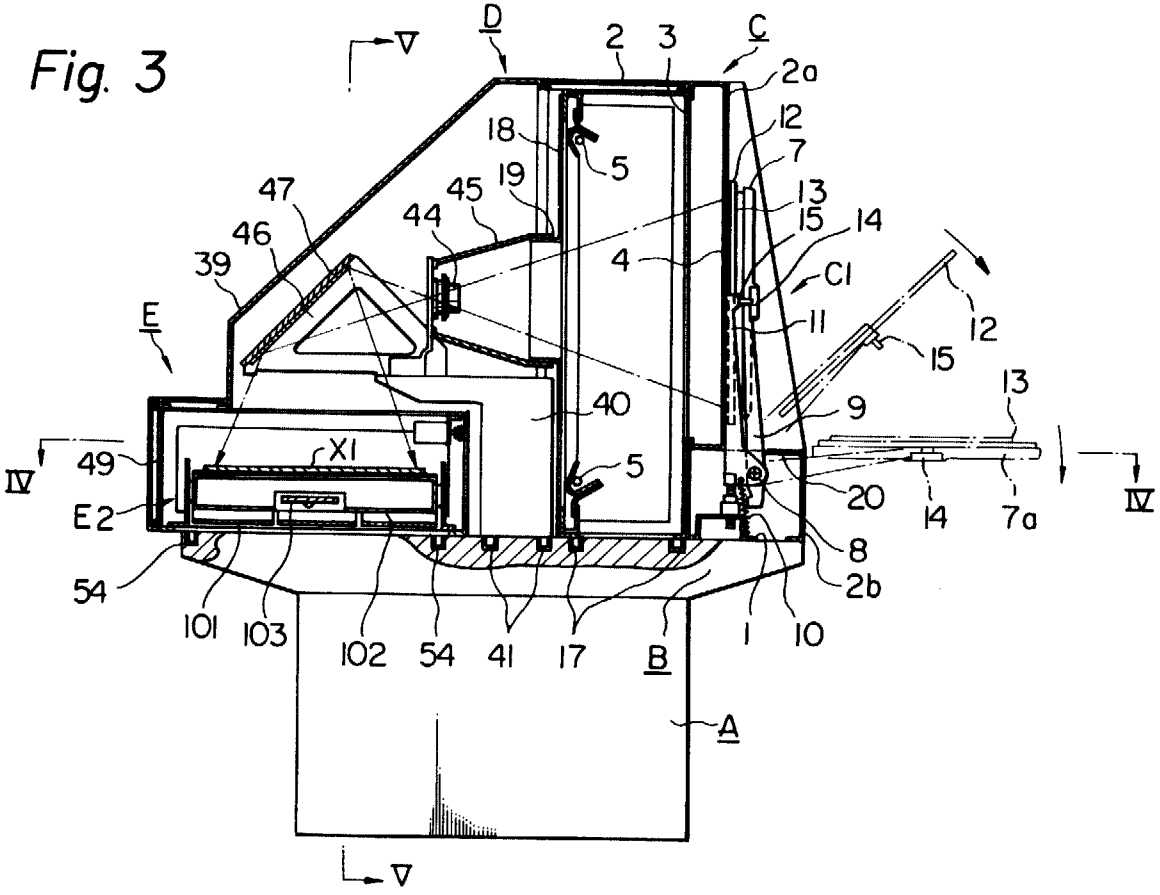
FIG. 3 is a central, partially-sectional view of said apparatus.

As shown in FIGS. 1 through 3, an electro-fax type of plate-making apparatus according to the present invention comprises:

- a bed "B" mounted on a base "A" and having a level surface 1;
- a manuscript table section "C" located at the front portion of the level surface 1 of the bed "B";
- an optical system section "D" located adjacent to the rear side of the manuscript table section "C", and;
- a processing system section "E" located under the rear end of the optical system section "D" and mounted on the level surface 1.

Figure 4:
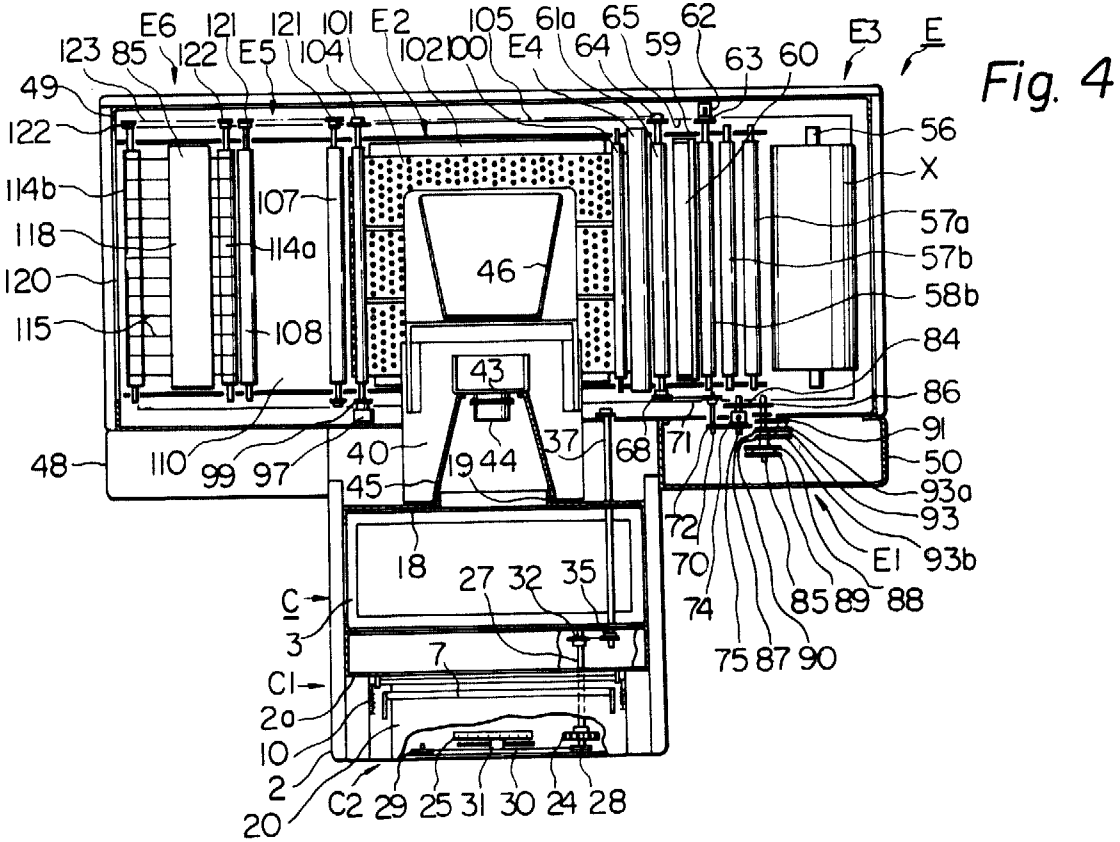
FIG. 4 is a partially-sectional view taken along the line IV—IV in FIG. 3.

The manuscript table section "C" comprises a housing 2 in the form of a camera, which has an opened rear side and a vertical front side 2a formed with a rectangular exposure window 4 (FIGS. 3 and 4). The housing 2 accommodates a vertically disposed frame 3 which is rectangularly formed. The frame 3 supports lamps 5 for illuminating said exposure window 4. The lamps 5 are lighted up during a period of time which is preset by a timer. The manuscript table section "C" also comprises a manuscript table unit "C1", which is provided on a table 2b and covers said exposure window 4. The table unit "C1" includes a manuscript table 7, and a cover 12 of transparent plate glass. The manuscript table 7 is carried by a pair of arms 9 which are pivoted to the table 2b by means of a pivot 8 (FIG. 3). The cover 12 is carried by a pair of arms 11, which are pivoted to said pivot 8 and also forced by a spring 10. A pad 13 which is made of an elastic material, e.g., a sponge rubber is affixed to the surface of the manuscript table 7. The table 7 also is formed, at its opposite lateral sides, with recesses 14 in which racks (not shown) are disposed. These racks are engaged with latches 15 which are secured at the corresponding positions to the cover 12. The setting of a manuscript can be carried out by laying the manuscript table 7 down to the horizontal position 7a (as shown by the phantom lines in FIG. 3), by placing the manuscript face up on the pad 13, by laying down the cover 12 and securing it to the table 7 by the latches 15 and, finally, by returning the manuscript table unit "C1" to the vertical position, shown by the solid line, with the force of the spring 10.

The housing 2 is studded on its bottom side with locating pins 17, and the level surface 1 of the bed "B" is formed with holes 16 (FIG. 2) located in correspondence to said pins 17. Therefore, by inserting said pins 17 into the holes 16, the location of the manuscript table section "C" with respect to the bed "B" can be secured.

The manuscript table section "C" also comprises a shade plate 18 which covers the rear side of the frame 3. This shade plate 18 is provided at the center thereof with a rectangular cylinder 19 which projects backwardly.

Figure 6:
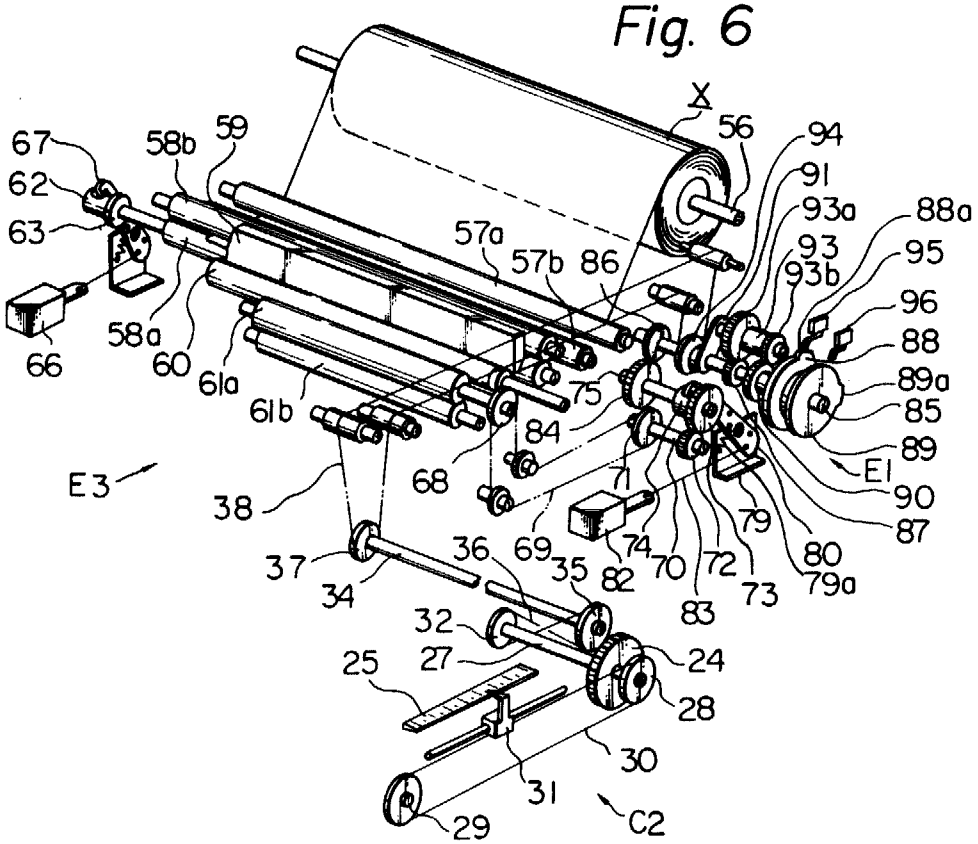
FIG. 6 is an enlarged perspective view showing a paper-feeding device and a random cutting device, as diassembled into parts.

The manuscript table section "C" further comprises an operating panel unit "C2" (FIGS. 1, 2 and 4) which is disposed under said manuscript table unit "C1". This operating panel unit "C2" includes a power switch 21, a start button 22, a timer 23 for setting the lighting period of time of the aforementioned illumination lamps 5, a dial 24 and a scale 25 used for setting the length of a roll of paper to be cut as described hereinafter, and a counter 26 for counting the number of sheets of papers; which components are all arranged on an operating panel 20. The dial 24, which is a component of a random cutting device "E1" described in detail hereinafter, is supported by an operating shaft 27 extending horizontally within the table 2b (FIG. 1), as shown in FIGS. 4 and 6. A wire 30 is wound around a pulley 28 secured to said shaft 27 and around a pulley 29 disposed within the table 2b. A pointer 31 is secured to said wire 30 to be moved together with the wire 30 along the scale 25. Therefore, the operator can set a desired length of the master paper by operating the dial 24 while monitoring the pointer 31. A driving pulley 32 secured to said shaft 27 is wound with a wire 36 which is, in turn, wound crosswise around a driven pulley 35. This pulley 35 is secured to a connecting shaft 34, the rear end portion of which extends into the processing system section "E". A driving sprocket 37 secured to the end of the shaft 34 drives the random cutting device "E1" via a rudder chain 38. The random cutting device "E1" will be explained in detail hereinafter.

Referring to FIGS. 2 and 3 again, the optical system section "D" comprises a housing 39 which is partially opened on the front and bottom sides thereof. This housing 39 accommodates a mount 40 which has an "L" shape as viewed from the lateral side. This mount 40 is studded on its bottom side with locating pins 41 as shown in FIG. 3, so that the location of the optical system section "D" with respect to the bed "B" can be secured by inserting said pins 41 into locating holes 42 formed in the level surface 1 of the bed "B". The mount 40 supports an upright mount plate 43 to which a projection lens 44 is secured with the field of vision thereof being directed towards the aforementioned exposure window 4. The projection lens 44 is surrounded by a hood 45, the front end of which is fitted into the rectangular cylinder 19 of the manuscript table section "C", when the optical system section "D" is mounted on the bed "B", so as to prevent the external light from leaking into the interior of the apparatus. A bracket 46 is secured to the mount 40 behind the mount plate 43 and projects backwardly from the mount 40. A reflex mirror 47 is secured to said bracket 46 within the field of projection of the lens 44, and also inclined at an angle of 45° to the optical axis of the lens 44. Accordingly, the mirror 47 reflects, at a right angle, the picture projected by the lens 44 towards an exposure station "E2", described hereinafter, of the processing mechanism section "E".

Figure 5:
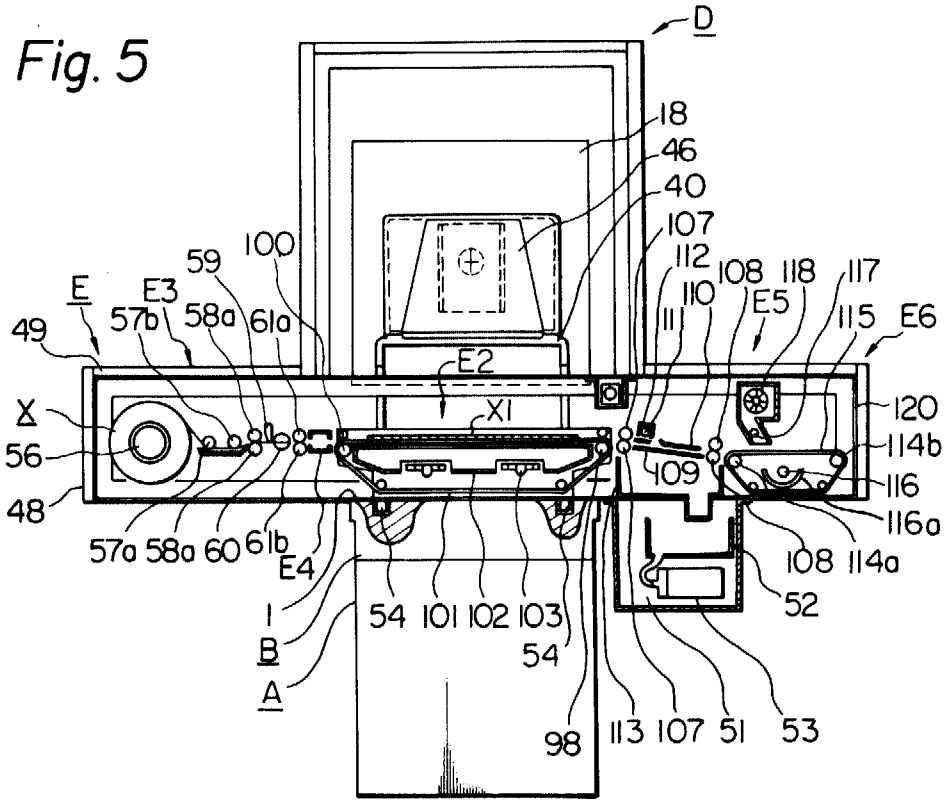
FIG. 5 is a partially-sectional view taken along the line V—V in the FIG. 3.

The processing system section "E" comprises a rectangular parallelepiped-shaped housing 48, which is disposed horizontally and also opened partially on its sides facing to the optical system section "D", i.e., the central upper side and the central front side. The housing 48 accommodates an elongated, rectangular parallelepiped-shaped frame 49, the opposite ends of which project from the bed "B". This frame 49 accommodates a paper-feeding mechanism "E3", an electrical charging device "E4", an exposure station "E2", a wet developing device "E5" and a drying and discharging device "E6", which components are all arranged end-to-end in a lateral direction within a horizontal plane, as shown in FIG. 4. The housing 48 has a front pocket 50 which is formed on the front side of said paper-feeding mechanism "E3", and a lower pocket 51 (FIG. 5) which is formed directly under said developing device "E5". Said front pocket 50 accommodates the main part of the random cutting device "E1" as described in detail hereinafter. Said lower pocket 51 accommodates a tank 52 containing a developing liquid (i.e., a toner-mixed liquid), and a pump 53. The frame 49 is studded on its bottom side with locating pins 54 as shown in FIGS. 3 and 5, and the level surface 1 is formed with locating holes 55 (FIG. 2) located in correspondence to said pins 54. Accordingly, by inserting the pins 54 into the holes 55, the location of the processing system section "E" with respect to the bed "B", thus, with respect to the optical system section "D", can be restrictedly secured.

The aforementioned paper-feeding mechanism "E3" comprises a pair of rollers 57a and 57b for correcting the curling condition of a roll of paper "X" suspended by a shaft 56, a pair of feed rollers 58a and 58b contacting with each other, a stationary cutting edge 59 and a rotary cutting edge 60 which are located adjacent to each other on the feeding-out side of said feed rollers 58a and 58b, and a pair of feed rollers 61a and 61b adjacent to said cutting edges 59 and 60. To the axial rear end of said feed roller 58a, a driving sprocket 63 is connected via a one-revolution clutch 62 (FIG. 6). The driving sprocket 63 is driven by a sprocket 64 secured to the axial rear end of the feed roller 61a, via a chain 65, as shown in FIG. 4. Referring back to FIG. 6, when a pawl 67 which is actuated by a solenoid 66 engages with a slot of the clutch 62, the power transmission from the sprocket 63 to the feed roller 58a is interrupted and, thus, the feed rollers 58a and 58b are then able to rotate freely. A further detailed explanation about clutch 62 is omitted herein, since this clutch is the same as the one incorporated in the random cutting device "E1" as described in detail hereinafter. Said rotary cutting edge 60 is connected to a solenoid which is not shown. When this solenoid is energized by a signal from the random cutting device "E1", said cutting edge 60 is quickly rotated so that the roll of paper "X" is cut to the required size.

Figure 7:
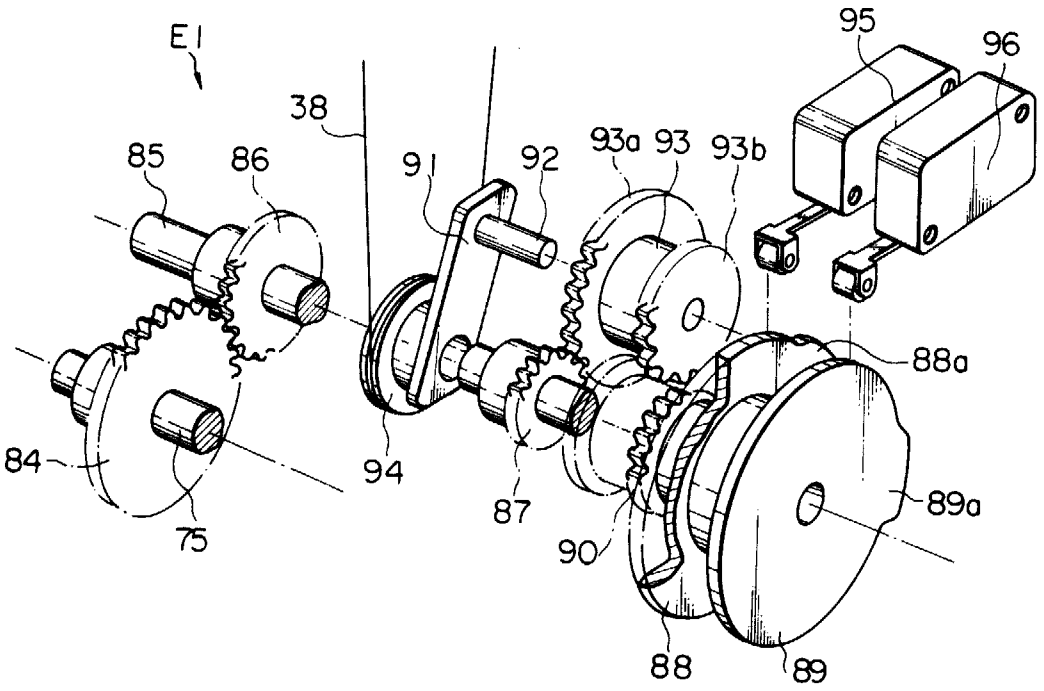
FIG. 7 is an enlarged perspective view showing the main part of said random cutting device, as disassembled into parts.
Figure 8:
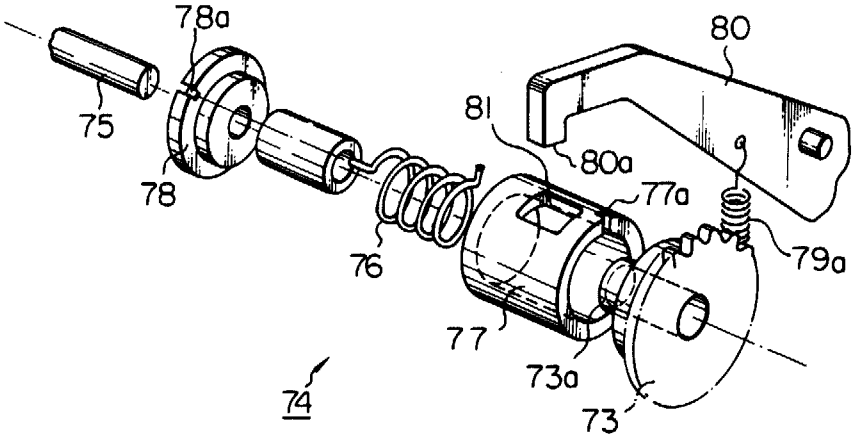
FIG. 8 is an enlarged perspective view showing a one-revolution clutch, as disassembled into parts.

The rotation of said feed roll 61a is transmitted to the random cutting device "E1", via a sprocket 68 secured to the axial front end of the feed roller 61a, a chain 69, and a sprocket 71 secured to a transmission shaft 70. The random cutting device "E1", shown as enlarged in FIGS. 6 through 8, comprises a reduction gear 73 which is engaged with a gear 72 secured to said transmission shaft 70. Said gear 73 transmits the rotation to a driving shaft 75 via a one-revolution clutch 74. As shown in the disassembled state in FIG. 8, the one-revolution clutch 74 comprises a sleeve 77 formed with a notch 77a. The sleeve 77 accommodates a coiled spring 76, one end of which engages with said notch 77a, and the other end of which engages with a notch 78a in a flange 78 secured to the driving shaft 75. The reduction gear 73 has a boss 73a which has an external diameter slightly larger than the internal diameter of the coiled spring 76, so as to be forcibly fitted into this spring 76. A pawl 80 is pivoted to a bracket 79 (FIG. 6) fixed adjacent to the transmission shaft 70 (FIG. 6), and is forced by a spring 79a (FIGS. 6 or 8) so that the free end 80a thereof falls into a slot 81 in the sleeve 77. Referring to FIGS. 6 and 8, a solenoid 82 is secured to a fixed member of the apparatus. This solenoid 82 is quickly energized when the start button 22 (FIG. 2) is pushed on, so as to actuate the pawl 80, via a rod 83, and so as to be disengaged quickly from the slot 81. As understood from the above, although the reduction gear 73 is rotated with the rotation of the feed roller 61a, the driving shaft 75 is never rotated during the period of time wherein the pawl 80 falls into the slot 81 of the sleeve 77, since the reduction gear 73 can slide with respect to the spring 76. In other words, the driving shaft 75 is permitted to rotate through only one revolution during the period of time between when the pawl 80 disengages from the slot 81 and when the same reengages with the slot 81 again.

The aforementioned random cutting device "E1" comprises a transmission gear 84, which is secured to said driving shaft 75 and engaged with driving gear 86 secured to a main shaft 85. Referring to FIG. 7, a sun gear 87 is secured to the main shaft 85, and a driven gear 90 is rotatably supported by the shaft 85 at a location adjacent to said sun gear 87. The driven gear 90 is integrally formed with a pair of peripheral cams 88 and 89, the phase angles of which in their rotational directions are different from each other. The random cutting device "E1" further includes an arm 91 rotatably supported by said main shaft 85. A planet gear 93 is rotatably supported by a shaft 92 secured to the arm 91. The arm 91 is integrally formed with a rudder wheel 94, and the rudder chain 38, aforementioned with regard to the manuscript table section "C" (FIG. 4), is wound around said rudder wheel 94. Said planet gear 93 has a driven gear 93a meshing with the sun gear 87, and a driving gear 93b meshing with the driven gear 90. The gear ratio of said sun gear 87, planet gear 93 and driven gear 90 is selected so that the driven gear 90 is rotated through one revolution for every one revolution of the sun gear 87. Therefore, when the sun gear 87 is driven to revolve, the planet gear 93 is rotated about its axis with the rotation of the sun gear 87, whereby the driven gear 90 is rotated through one revolution for every one revolution of the driving shaft 75.

Said peripheral cams 88 and 89 have projections 88a and 89a, respectively, the phase angles of which in their rotational directions are different from each other. Two limit switches 95 and 96 are secured to a fixed member of the apparatus so as to be located opposite to said projections 88a and 89a. The limit switch 95 corresponding to the advanced cam 88 can energize the aforementioned solenoid for actuating said rotary cutting edge 60 (FIG. 6). The other limit switch 96 is turned on at a time later than the turning on of the limit switch 96, when detecting the projecting 89a, so as to cut off a clutch 99 (FIG. 4) which is interposed between a main motor 97 (as described hereinafter with regard to the exposure station "E2") and a driving roller 98 (FIG. 4), thereby stopping the exposure station "E2", and so as to simultaneously trigger the timer 23 (FIG. 2) to turn on the illuminating lamps 5 (FIG. 3).

With regard to the random cutting device "E1" constructed as aforementioned, when the dial 24 is operated by the operator, the rotation of the dial 24 is transmitted to the arm 91, via the operating shaft 27, the wire 36, the connecting shaft 34, the rudder chain 38 and the rudder wheel 94 as shown in FIG. 6. In other words, the rotational position of the rudder wheel 94 of the random cutting device "E1" (i.e. the position in which the planet gear 93 meshes with the sun gear 87) is determined by the rotation of the dial 24. Therefore, it is possible to select the initial positions of the cams 88 and 89 relative to the limit switches 95 and 96, i.e., the relative positions of the projections 88a and 89a to the limit switches 95 and 96, at the starting of the apparatus. Accordingly, when the sun gear 87 is rotated in correspondence to the rotation of the feed roller 61a, which relates to the amount of feed of the roller of paper "X", the driven gear 90 is rotated by the planet gear 93 and the limit switches 95 and 96 are successively turned on after a lapse of time, the length of which is proportionally inverse to the initial positions of the cams 88 and 89.

Referring to FIGS. 4 and 5, the electrical charging device "E4" is located adjacent to the paper-feeding mechanism "E3". The master paper "X1", which has already been cut by said stationary and rotary cutting edges 59 and 60, is electrically charged while passing through said charging device "E4" and is successively fed onto the exposure station "E2".

Referring to FIGS. 4 and 5 also, the exposure station "E2" is located adjacent to said charging device "E4" in the horizontal direction and comprises a plurality of parallel, endless conveyor belts 101, which are wound around a driving roller 98 and a roller 100 arranged parallel to each other. These conveyor belts 101 have a plurality of suction ports (FIG. 4) adapted for causing the master paper "X1" to be adhered to the belt surfaces. The exposure table "E2" also comprises a suction box 102, which is disposed inside the conveyor belts 101 and which is provided at its bottom with fans 103. The master paper "X1" on the conveyor belts 101 is caused to adhere to the belts 101 by the suction produced by said fans 103. FIG. 4 further shows a sprocket 104 which is secured to the end of the driving roller 98. A chain 105 is wound around the sprocket 104 so as to transmit the rotation to the sprocket 64 secured to said feed roller 61a.

The developing device "E5" adjacent to said exposure station "E2" comprises, as shown in FIGS. 4, 5 and 9 through 11, first and second pairs of rollers 107 and 108, which pairs are spaced apart from each other in the forwarding direction of the master paper "X1". Between these rollers 107 and 108, a guide element 109, an electrode plate 110, and a developing-liquid supplying device 112 including an injection pipe 111, are disposed. The guide element 109 comprises a conductible grid 109a and an auxiliary electrode plate 109b located with a small gap under the grid 109a. The guide element 109 is downwardly inclined with respect to the level in the direction from the rollers 107 to the rollers 108. The main electrode plate 110 is located above the guide element 109 so as to define a passage therebetween for both the passage of the master paper "X1" and the flow of the developing liquid. The developing-liquid supplying device 112 is located above the guide element 109 and adjacent to the rollers 107. The device 112 is made in the form of a closed box acting as a flow guide and is formed with a slit 112a in its bottom. The injection pipe 111 is extended into the device 112 and is formed with a plurality of injection nozzles 111a in the portion accommodated within said device 112. Under the guide element 109, a receiver 113 for collecting the injected liquid is disposed. This receiver 113 is opened at its bottom into the aforementioned tank 52 (FIG. 5) containing the developing liquid (i.e., the toner-mixed liquid).

Figure 9:
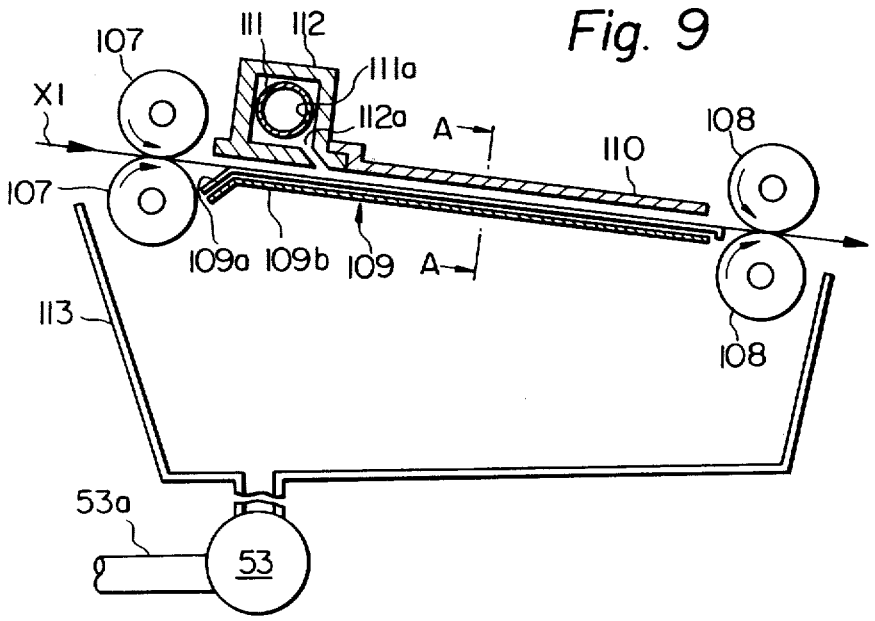
FIG. 9 is an enlarged sectional view of a developing device according to the present invention.
Figure 10:
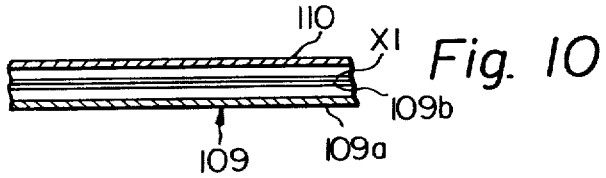
FIG. 10 is a partially cross-sectional view taken along the line A—A in FIG. 9.
Figure 11:
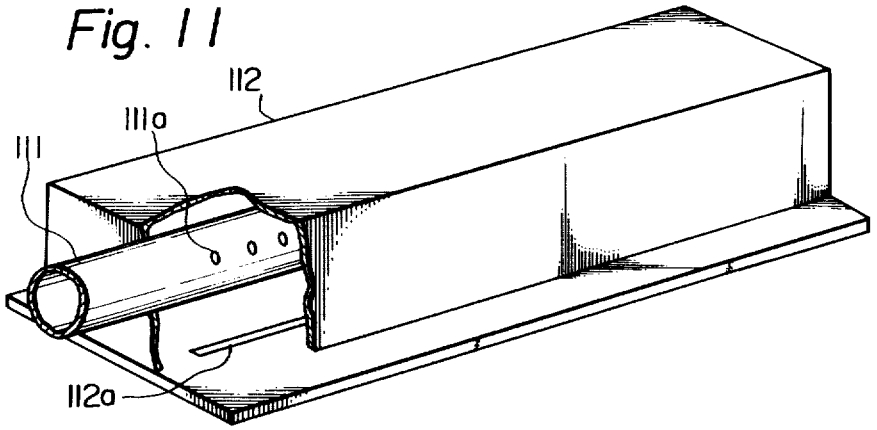
FIG. 11 is an enlarged perspective view of a developing-liquid supplying device, as partially cut off.

In operation, the developing liquid in the tank 52 is delivered under pressure by the aforementioned pump 53 into the injection pipe 111, via a horse 53a (FIG. 9). This delivered liquid is injected from the nozzles 111a into the device 112 and, then, supplied through the slit 112a into said passage between the guide element 109 and the main electrode plate 110. In this case, the flow of the developing liquid becomes uniform to a certain extent when being injected from the nozzles 111a and, further, said flow becomes sufficiently uniform when being supplied through the slit 112a. Therefore, when the master paper "X1" is fed by the rollers 107 into the passage between the guide element 109 and the main electrode plate 110, the developing liquid is injected onto the surface of the master paper upon which the latent image is recorded, whereby the latent image is developed into a visible picture while the master paper is being passed through said passage. Said main and auxiliary electrode plates 110 and 109b contribute to improve the quality of the developed visible picture.

Said conductible grid 109a contributes to provide a smooth passage of the master paper "X1" by preventing the flapping of the trailing end of the master paper "X1". Specifically, while passing through said passage between the guide element 109 and the main electrode plate 110, the master paper "X1" is pressed against the grid 109a by the developing liquid injected from the device 112; thus, the gap between the master paper "X1" and the main electrode plate 110 is maintained constant. Further, after the trailing end of the master paper "X1" has passed through the device 112, the injected developing liquid flows into the aforementioned gap between the grid 109a and the auxiliary elecrode plate 109b. This prevents the trailing end of the master paper "X1" from being caused to flap by the injected developing liquid, and, thus the occurrence of scratches and the unevenness of the development.

The master paper "X1" is then fed out by the rollers 108 with the surplus developing liquid being squeezed by the rollers 108. The surplus developing liquid flowing out from the passage, including said squeezed liquid, is collected by the receiver 113 to be returned to the tank 52 (FIG. 5). As the developing liquid is circulated under pressure by the pump 53, a uniformly-mixed liquid can always be supplied onto the master paper.

The master paper "X1" processed for development in the developing device "E5" is next fed into the drying and discharging device "E6". This device "E6" comprises a plurality of parallel, endless belts 115 wound around a pair of rollers 114a and 114b, a heater 116 with a reflex mirror 116a (FIG. 5), and a blower 118 with a heating coil 117. The master paper "X1" is blown by the hot wind from the blower 118 against the belts 115 so as to be conveyed by the latter, while being dried by the hot wind, and said master paper is finally discharged from the outlet 120 into a paper receiver (not shown). It should be noted that said rollers 107 and 108 of said developing device "E5" and the rollers 114a and 114b of the drying and discharging device "E6" have sprockets 121 and 122, respectively, as shown in FIG. 4, which cooperate with a chain 123 wound around the sprocket 104 secured to said driving roller 98 so as to transmit the rotation.

Figure 12:
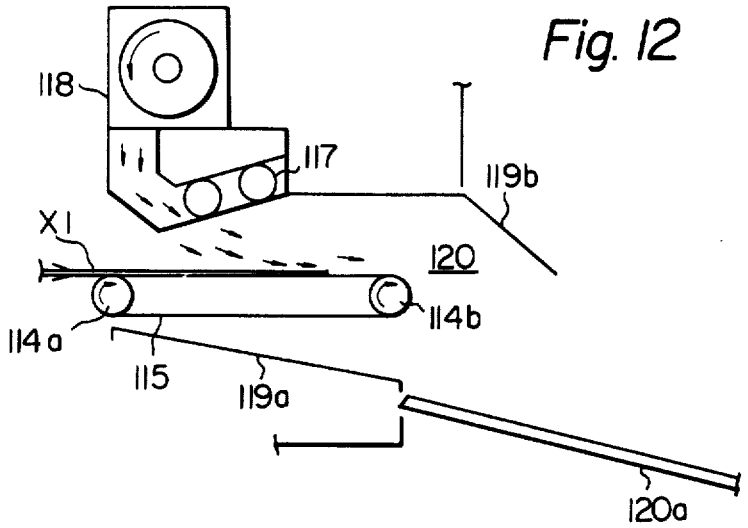
FIGS. 12 and 13 are diagrammatic views showing the arrangement of a modification of a drying and discharging device according to the present invention, in two respective operating positions.
Figure 13:
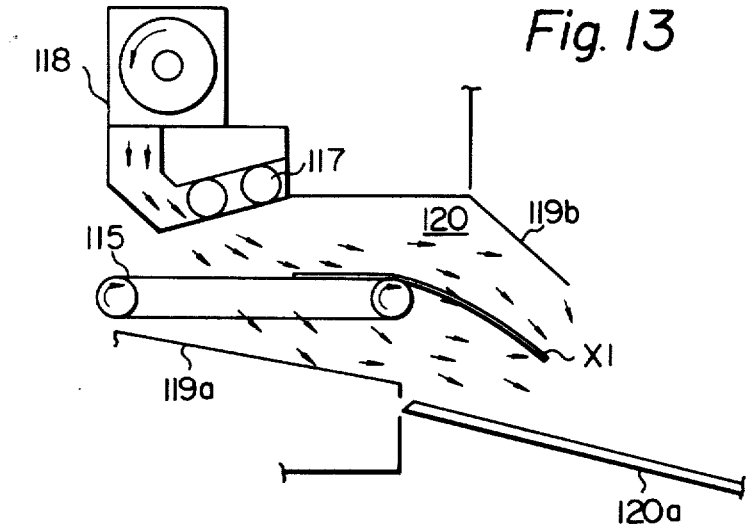

A preferable modification of the drying and discharging device "E6" is illustrated diagrammatically in FIGS. 12 and 13, in which the parts similar to those shown in FIG. 5 are referred to by the same reference numbers. This modication is generally different from the embodiment shown in FIG. 5, in view of the fact that the heater 116 has been omitted and wind guides 119a and 119b have been added. In operation, the master paper "X1" is blown by the hot wind from the blower 118 against the belts 115, while being dried, as shown in FIG. 12. After the trailing end of the master paper "X1" has passed the outlet of the blower 118, as shown in FIG. 13, a part of the hot wind is directed along the lower guide 119a so as to upwardly press the leading end of the master paper "X1", while the other part is directed along the upper guide 119b so as to downwardly press said leading end. Accordingly, the master paper "X1" is smoothly discharged from the outlet 120 into a paper receiver 120a with the leading end sliding into the receiver 120a. Since the hot wind is also directed into the receiver 120a, the discharged master paper continues to be dried until the next paper is discharged into the receiver 120a.

The operation of the above-described plate-making apparatus will be explained below.

When the power switch 21 is pushed on, the main motor 97, the fan 103 and the pump 53 start to operate, whereby the feed rollers 61a and 61b, the electrical charging device "E4", the exposure station "E2", the developing device "E5" and the drying and discharging device "E6" are brought into the operating status. Therefore, the plate-making process can be automatically carried out by setting the manuscript in the manuscript table section "C" in the aforementioned manner, by setting the dial 24 to determine the cutting length of the roll of paper in correspondence to the size of the manuscript and, finally, by pushing on the start button 22.

When the start button 22 is pushed on, the solenoids 66 and 82 are energized and, thus, the pawls 67 and 80 are quickly actuated to disengage from the one-revolution clutches 62 and 74. Accordingly, with the rotation of the feed roller 61a, the sun gear 87 is rotated and thus the leading end of the roll of paper "X" being held between the feed rollers 58a and 58b is fed to the feed rollers 61a and 61b. When the feed roller 58a has been rotated through one revolution, the pawl 67 falls into the one-revolution clutch 62. In this status, the transmission of the driving power to the feed roller 58a is interrupted, thus, the feed roller 58a is able to rotate freely due to the function of the one-revolution clutch 62. Accordingly, the leading end of the roll of paper "X" is fed out towards the electrical charging device "E4" by the subsequent rotation of the feed rollers 61a and 61b. When the number of revolution of the feed rollers 61a and 61b reaches a predetermined number, the protection 88a of the cam 88 is detected by the limit switch 95 and, thus, the rotary cutting edge 60 is quickly actuated by the solenoid, whereby the master paper "X1" which has been cut in a predetermined size can be provided. In this status, the reduction gear 73 is subsequently rotated by the rotation of the feed roller 61a, but the sun gear 87 stops rotating due to the engagement of the pawl 80 with the one-revolution clutch 74.

Then, the master paper "X1" is electrically charged by the electrical charging device "E4" and conveyed onto the exposure station "E2" by the movement of the conveyor belts 101. When the master paper "X1" reaches directly under the reflex mirror 47, the projection 89a of the cam 89 turns the limit switch 95 on. By the output signal from the limit switch 95, the clutch 99 is cut off, and the timer 23 is triggered. As a result from this, the conveyor belts 101 of the exposure station "E2" are stopped, and the lighting lamps 5 are turned on during the period of time preset by the timer 23. Accordingly, the master paper "X1" is exposed and, thus, the picture of the manuscript is recorded on the master paper "X1" as an electrostatic latent image.

When the timer 23 resumes its normal condition after a lapse of said preset time, the clutch 99 is connected. Thus, the master paper "X1" on the exposure station "E2" is transferred to the developing device "E5", and the latent image thereof is developed into a visible picture.

Finally, by the drying and discharging device "E6", the master paper "X1" is dried and discharged from the outlet 120.

The present invention has many advantages as mentioned below.

The operating is easy since the manuscript table unit can be disposed adjacent to the operating panel. The locating of the manuscript can be carried out without much inconvenience to the operator, since the manuscript can be placed face up on the table for setting thereof. Since the master paper is forwarded in a horizontal direction, a thick master paper can be processed. This substantially eliminates the danger of the master paper being jammed in the processing system. Another important advantage is that the apparatus can be disassembled into several sections, accordingly, individual manufacturing and transporting processes can be carried out for each section. These advantages make the apparatus according to the present invention considerably more superior as compared to a known apparatus which is forcibly reduced in size.

Further, the wet developing device according to the present invention can always provide the best quantity of development without occurrences of the aforementioned problems such as scratches and unevenness of the development.

Still further, the drying and discharging device according to the present invention can provide a very stable feeding and discharging process of the master paper without sailing the image formed on the master paper, since the master paper is conveyed by being blown by the hot wind against the conveyor belts. The master paper can continue to be dried after being discharged into the receiver. This contributes to improve the efficiency of the drying process and, thus, shortens the duration of the passage previously required for sufficient drying.

It should be noted that the shown embodiment is constructed so that the manuscript table section "C", the optical system section "D" and the master paper processing system section "E" are all mounted on the level surface 1 of the bed "B" so as to secure the locating of them with respect to each other. However, the optical system section "D", which requires an accurate adjustment and has a relatively light weight, may be mounted to the processing system section "E" or to the manuscript table section "C".

The invention has been described in detail with particular reference to the preferable embodiment thereof, but it will be understood that other variations and modifications can be realized within the spirit and scope of the invention.

What we claim is:

[1. An electro-fax type of apparatus for making a plate for offset printing, comprising:

a manuscript table section comprising a first housing having a vertical exposure window formed in the front thereof, a manuscript table unit mounted on the front side of said first housing and adapted to cover said exposure window and to be laid down on the front side of said exposure window so that a manuscript is placed face upward thereon and, then, set face backward at said exposure window and lamp means accommodated in said first housing for illuminating said exposure window;

an optical system section comprising a second housing, a projection lens accommodated in said second housing and located in the rear of said exposure window to project the picture of the manuscript in the backward direction, and a mirror accommodated in said second housing and located in the rear of said projection lens to reflect the projected picture in the downward direction, and;

a master paper processing system section comprising a third housing and a system accommodated in said third housing for processing a master paper to be made into said plate, said master paper-processing system comprising a plurality of components including a paper feeding mechanism, an electrically charging device, an exposure station located directly under said mirror, a wet developing device and a drying and discharging device, said components being so arranged that said master-paper is forwarded along a substantially straight path extending in a horizontal plane and in a lateral direction to the apparatus which is perpendicular to the direction of the optical axis of said projection lens.]

2. An *electro-fax type of* apparatus [according to claim 1,] *for making a plate for offset printing, comprising:*

*a manuscript table section comprising a first housing having a vertical exposure window formed in the front thereof, a manuscript table unit mounted on the front side of said first housing and adapted to cover said exposure window and to be laid down on the front side of said exposure window so that a manuscript is placed face upward thereon and, then, set face backward at said exposure window and lamp means accommodated in said first housing for illuminating said exposure window;*

*an optical system section comprising a second housing, a projection lens accommodated in said second housing and located in the rear of said exposure window to project the picture of the manuscript in the backward direction, and a mirror accommodated in said second housing and located in the rear of said projection lens to reflect the projected picture in the downward direction, and;*

*a master paper processing system section comprising a third housing and a system accommodated in said third housing for processing a master paper to be made into said plate, said master paper-processing system comprising a plurality of components including a paper feeding mechanism, an electrically charging device, an exposure station located directly under said mirror, a wet developing device and a drying and discharging device, said components being so arranged that said master paper is forwarded along a substantially straight path extending in a horizontal plane and in a lateral direction to the apparatus which is perpendicular to the direction of the optical axis of said projection lens;* wherein said sections are formed into units, respectively, which are separable from one another, and said apparatus further comprises bed means for supporting said sections to be in association with each other.

3. An apparatus according to claim 2, wherein said bed means comprises a level surface, said housings of the respective sections being mounted on said level surface.

4. An apparatus according to claim 3, wherein said housings of the respective sections are provided at the bottoms with projected pins and said level surface is formed with holes adapted to receive said pins of the housings for locating the sections with respect to each other.

[5. An apparatus according to claim 1, wherein said manuscript table unit comprises:

a table carried by first arm means connected to said first housing via a pivot, said table being movable between a horizontally lying-down position in which the manuscript can be placed face upward thereon and a vertically getting-up position in which the placed manuscript is set at the exposure window;

a cover of a transparent material carried by second arm means connected to the first housing via said pivot, and;

means for securing said cover to said table so as to hold the manuscript in place on the table.]

6. An *electro-fax type of* apparatus [according to claim 5,], *for making a plate for offset printing, comprising:*

*a manuscript table section comprising a first housing having a vertical exposure window formed in the front thereof, a manuscript table unit mounted on the front side of said first housing and adapted to cover said exposure window so that a manuscript is placed face upward thereon and, then, set face backward at said exposure window and lamp means accommodated in said first housing for illuminating said exposure window, wherein said manuscript table unit further comprises a table carried by first arm means connected to said first housing via a pivot, said table being movable between a horizontally lying-down position in which the manuscript can be placed face upward thereon and a vertically getting-up position in which the position in which the placed manuscript is set at the exposure window, a cover of a transparent material carried by second arm means connected to the first housing via said pivot, and means for securing said cover to said table so as to hold the manuscript in place on the table* wherein said means for securing the cover *further* comprises racks provided for said table, and latches provided for the cover and adapted to engage with said racks;

*an optical system section comprising a second housing, a projection lens accommodated in said second housing and located in the rear of said exposure window to project the picture of the manuscript in the backward direction, and a mirror accommodated in said second housing and located in the rear of said projection lens to reflect the projected picture in the downward direction, and;*

*a master paper processing system section comprising a third housing and a system accommodated in said third housing for processing a master paper to be made into said plate, said master paper-processing system comprising a plurality of components including a paper feeding mechanism, an electrically charging device, an exposure station located directly under said mirror, a wet developing device and a drying and discharging device, said components being so arranged that said master paper is forwarded along a substantially straight path extending in a horizontal plane and in a later direction to the apparatus which is perpendicular to the direction of the optical axis of said projection lens.*

[7. An apparatus according to claim 1, wherein said paper feeding mechanism comprises:

a roll of paper suspended for rotating freely in the second housing;

roller means for feeding said roll of paper, and;

a random cutting device for cutting said roll of paper so as to provide a master paper with a size corresponding to that of the manuscript.]

8. An *electro-fax type of* apparatus [according to claim 7,] *for making a plate for offset printing, comprising:*

*a manuscript table section comprising a first housing having a vertical exposure window formed in the front thereof, a manuscript table unit mounted on the front side of said first housing and adapted to cover said exposure window formed in the front thereof, a manuscript table unit mounted on the front side of said first housing and adapted to cover said exposure window and to be laid down on the front side of said exposure window so that a manuscript is placed face upward thereon and, then, set face backward at said exposure window and lamp means accommodated in said first housing for illuminating said exposure window;*

*an optical system section comprising a second housing, a projection lens accommodated in said second housing and located in the rear of said exposure window to project the picture of the manuscript in the backward direction, and a mirror accommodated in said second housing and located in the rear of said projection lens to reflect the projected picture in the downward direction, and;*

*a master paper processing system section comprising a third housing and a system accommodated in said third housing for processing a master paper to be made into said plate, said master paper-processing system comprising a plurality of components including a paper feeding mechanism, an electrically charging device, an exposure station located directly under said mirror, a wet developing device and a drying and discharging device, said components being so arranged that said master paper is forwarded along a substantially straight path extending in a horizontal plane and in a lateral direction to the apparatus which is perpendicular to the direction of the optical axis of said projection lens, wherein said paper feeding mechanism further comprises a roll of paper suspended for rotating freely in the third housing, roller means for feeding said roll of paper,* wherein said [feeding] roller means [comprises:] *further includes* first rollers;

second rollers disposed on the feeding-out side of the first rollers, and;

driving means for said first and second rollers, said driving means including clutch means for normally cutting off the transmission of the drive to said first rollers so as to make said first rollers freely rotatable and for transmitting the drive to said first rollers so as to feed the leading end of the roll of paper of said second rollers when the apparatus is started to operate, *and, a random cutting device for cutting said roll of paper so as to provide a master paper with a size corresponding to that of the manuscript.*

9. An apparatus according to claim 8, wherein said clutch means comprises a one-revolution clutch; said clutch comprising a driving element rotatably supported by the shaft of one of the first rollers, a coiled spring connected to said driving element by friction, a sleeve having a slot and connected to one end of said spring, a member secured to said shaft of the roller and connected to the other end of the spring, a pawl pivoted to a fixed member and adapted to fall into said slot of the sleeve so as to prevent the sleeve from being rotated, spring means for forcing the pawl to be engaged with the sleeve, and means for actuating the pawl to disengage from the sleeve when the apparatus is started to operate, whereby said first rollers are driven through one revolution until the pawl engages with the sleeve again.

10. An apparatus according to claim 9, wherein said random cutting device comprises:

a cutting device disposed between said first and second rollers, means for operating said cutting device in correspondence with the feeding amount of the roll of paper, and means for settng a length of the master paper to be cut.

11. An apparatus according to claim 10, wherein said cutting device comprises a stationary cutting edge and a rotary cutting edge cooperating with said stationary cutting device, and said operating means comprises a solenoid for actuating said rotary cutting edge, a limit switch adapted to energize said solenoid, a cam means adapted to actuate said limit switch, and means for driving said cam means in correspondence with the rotation of said second rollers.

12. An apparatus according to claim 11, wherein said driving means for the cam means comprises a one-revolution clutch adapted to prevent the cam means from actuating said limit switch.

13. An apparatus according to claim 12, wherein said length setting means comprises means for setting the initial phase angle of the cam means relative to said limit switch.

14. An apparatus according to claim 13, wherein said length setting means comprises a dial adapted to be operated by an operator, and means for indicating the length to be set so as to permit the operator to operate said dial by monitoring said indicating means.

15. An apparatus according to claim 14, wherein said dial and indicating means are incorporated into an operating unit, which is disposed in front of the first housing of said manuscript table section.

16. An apparatus according to claim 15, wherein said operating unit further comprises a power switch, a start button, a counter for counting the number of sheets of the master paper.

[17. An apparatus according to claim 1, wherein said exposure station comprises:

a driving roller, a roller disposed parallel to said driving roller, a plurality of parallel, endless conveyor belts wound around said rollers for conveying the master paper forwarded from the paper feeding mechanism through the electrical charging device, and suction means for adhering the master paper onto said conveyor belts.]

[18. An apparatus according to claim 17, wherein the exposure station further comprises means for stopping said driving roller and, simultaneously, turning on said lamp means when the master paper is located directly under the reflex mirror, whereby the master paper is exposed to the projected picture.]

19. An *electro-fax type of* apparatus [according to claim 1,] *for making a plate for offset printing, comprising:*

*a manuscript table section comprising a first housing having a vertical exposure window formed in the front thereof, a manuscript table unit mounted on the front side of said first housing and adapted to cover said exposure window and to be laid down on the front side of said exposure window so that a manuscript is placed face upward thereon and, then, set face backward at said exposure window and lamp means accommodated in said first housing for illuminating said exposure window;*

*an optical system section comprising a second housing, a projection lens accommodated in said second housing and located in the rear of said exposure window to project the picture of the manuscript in the backward direction, and a mirror accommodated in said second housing and located in the rear of said projection lens to reflect the projected picture in the downward direction, and;*

*a master paper processing system section comprising a third housing and a system accommodated in said third housing for processing a master paper to be made into said plate, said master paper-processing system comprising a plurality of components including a paper feeding mechanism, an electrically charging device, an exposure station located directly under said mirror, a wet developing device and a drying and discharging device, said components being so arranged that said master paper is forwarded along a substantially straight path extending in a horizontal plane and in a lateral direction to the apparatus which is perpendicular to the direction of the optical axis of said projection lens,* wherein said developing device *further* comprises:

rollers for feeding the master paper forwarded from the exposure station;

discharging rollers spaced apart from said [driving] *feeding* rollers;

a guide element disposed between said feeding rollers and discharging rollers so as to define a passage for both the master paper and a developing liquid[;], *wherein said guide element comprises a conductible grid, and an auxiliary electrode plate disposed with a small gap under said grid;* an electrode plate disposed above said guide element, and;

means for supplying the developing liquid to said passage.

[20. An apparatus according to claim 19, wherein said guide element is downwardly inclined with respect to the level in the direction from said feeding rollers to the discharging rollers.]

21. An apparatus according to claim 19, *wherein said guide element and electrode plate are downwardly inclined with respect to the level in the direction from said feeding rollers to the discharging rollers, and* wherein said developing-liquid supplying means comprises:

a device for injecting the developing liquid disposed above the guide element and adjacent to the feeding rollers;

a tank containing the developing liquid;

pump means for delivering said liquid in the tank to said injecting device, and;

means connected to said tank for collecting the surplus injected liquid.

22. An apparatus according to claim 21, wherein said developing-liquid injection device comprises a flow-guide box in the form of a closed box formed with a slit in its bottom, and an injection pipe extending into said flow-guide box and formed with a plurality of injection nozzles in the portion accommodated within said box, said injection pipe being connected to said pump means.

[23. An apparatus according to claim 19, wherein said guide element comprises a conductible grid, and an auxiliary electrode plate disposed with a small gap under said grid.]

[24. An apparatus according to claim 1, wherein said drying and discharging device comprises:

a driving roller;

a roller disposed parallel to said driving roller;

a plurality of parallel, endless conveyor belts for conveying the master paper forwarded from the developing device, and;

blower means disposed above the conveyor belts and heater means for producing a hot wind, whereby said master paper is blown by the hot wind against the conveyor belts so as to be conveyed by the latter, while being dried.]

25. An *electro-fax type of* apparatus [according to claim 24,] *for making a plate for offset printing, comprising:*

*a manuscript table section comprising a first housing having a vertical exposure window formed in the front thereof, a manuscript table unit mounted on the front*

*side of said first housing and adapted to cover said exposure window and to be laid down on the front side of said exposure window so that a manuscript is placed face upward thereon, and, then, set face backward at said exposure window and lamp means accommodated in said first housing for illuminating said exposure window;*

*an optical system section comprising a second housing, a projection lens accommodated in said second housing and located in the rear of said exposure window to project the picture of the manuscript in the backward direction, and a mirror accommodated in said second housing and located in the rear of said projection lens to reflect the projected picture in the downward direction, and;*

*a master paper processing system section comprising a third housing and a system accommodated in said third housing for processing a master paper to be made into said plate, said master paper-processing system comprising a plurality of components including a paper feeding mechanism, an electrically charging device, an exposure station located directly under said mirror, a wet developing device and a drying and discharging device, said components being so arranged that said master paper is forwarded along a substantially straight path extending in a horizontal plane and in a lateral direction to the apparatus which is perpendicular to the direction of the optical axis of said projection lens, wherein said drying and discharging device further comprises a driving roller, a roller disposed parallel to said driving roller, a plurality of parallel, endless conveyor belts for conveying the master paper forwarded from the developing device, and, blower means disposed above the conveyor belts and heater means for producing a hot wind, whereby said master paper is blown by the hot wind against the conveyor belts so as to be conveyed by the latter, while being dried,* wherein said drying and discharging device further comprises:

a first wind guide disposed above the conveyor belts, a second wind guide disposed under the conveyor belts, and a receiver disposed at an outlet for the master paper, said wind guides extending along the [conveyor] *conveyor* belts to said outlet.

* * * * *

UNITED STATES PATENT OFFICE

CERTIFICATE OF CORRECTION

Patent No. RE 31,177 Dated March 15, 1983

Inventor(s) Masahiro Kogiso et al

It is certified that error appears in the above-identified patent and that said Letters Patent are hereby corrected as shown below:

Column 14, line 36 "of" should be --to--

Column 14, line 62 "settng" should be --setting--

Signed and Sealed this

Fifth Day of July 1983

[SEAL]

Attest:

GERALD J. MOSSINGHOFF

Attesting Officer

Commissioner of Patents and Trademarks